(12) United States Patent
Folkesson et al.

(10) Patent No.: US 11,981,197 B2
(45) Date of Patent: May 14, 2024

(54) POWERTRAIN, A METHOD FOR CONTROLLING A POWERTRAIN, AND A VEHICLE

(71) Applicant: Volvo Truck Corporation, Gothenburg (SE)

(72) Inventors: Johan Folkesson, Skene (SE); Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/960,415

(22) Filed: Oct. 5, 2022

(65) Prior Publication Data

US 2023/0132022 A1 Apr. 27, 2023

(30) Foreign Application Priority Data

Oct. 27, 2021 (EP) ...................................... 21204924

(51) Int. Cl.
*B60K 1/02* (2006.01)
*B60K 17/02* (2006.01)
(Continued)

(52) U.S. Cl.
CPC ................ *B60K 17/28* (2013.01); *B60K 1/02* (2013.01); *B60K 17/02* (2013.01); *F16H 3/091* (2013.01);
(Continued)

(58) Field of Classification Search
CPC ......... F16H 3/091; F16H 37/065; B60K 1/02; B60K 17/02; B60K 17/28
See application file for complete search history.

(56) References Cited

U.S. PATENT DOCUMENTS

| 4,405,029 A * | 9/1983 | Hunt ........................ B60K 6/24 |
| | | 192/48.91 |
| 10,583,732 B2 * | 3/2020 | Iwano ...................... F16H 3/091 |

FOREIGN PATENT DOCUMENTS

| DE | 102020101667 A1 | 7/2021 |
| JP | 2013112074 A | 6/2013 |
| WO | 2019105508 A1 | 6/2019 |

OTHER PUBLICATIONS

Extended European Search Report, EP21204924.1, dated Apr. 20, 2022, 10 pages.

* cited by examiner

*Primary Examiner* — William C Joyce
(74) *Attorney, Agent, or Firm* — Sage Patent Group (57) ABSTRACT

The invention relates to a vehicle powertrain, comprising:
first and second power units (PUs),
a propeller shaft, (PS)
a power take-off, (PTO),
a transmission comprising:
 first and second input shafts connected to the PUs, an output shaft connected to the PS, and a countershaft connected to the PTO,
 first and second input shaft gearwheels (ISGs) on the input shafts,
 first and second countershaft gearwheels (CSGs), the first CSG being in driving connection with the second ISG,
 first, second and third output shaft gearwheels (OSGs) in driving connection with the first ISG and the first and second CSGs,
 first and second gear engaging devices (GEDs), wherein, in a mode of operation, the first GED rotationally connects the first OSG to the output shaft, and the second GED rotationally disconnects (Continued)

the output shaft from the second and third OSGs, no parts of the powertrain being drivingly connected to both of the PUs.

20 Claims, 4 Drawing Sheets

(51) Int. Cl.
*B60K 17/28* (2006.01)
*F16H 3/091* (2006.01)
*F16H 37/06* (2006.01)
(52) U.S. Cl.
CPC ... *F16H 37/065* (2013.01); *F16H 2200/0021* (2013.01)

POWERTRAIN, A METHOD FOR CONTROLLING A POWERTRAIN, AND A VEHICLE

CROSS REFERENCE TO RELATED APPLICATIONS

This application claims foreign priority to European Application No. 21204924.1 filed on Oct. 27, 2021, the disclosure and content of which is incorporated by reference herein in its entirety.

TECHNICAL FIELD

The invention relates to a powertrain, a method for controlling a powertrain, a powertrain control device, and a vehicle.

The invention can be applied in heavy-duty vehicles, such as trucks, buses, and construction equipment. Although the invention will be described with respect to a truck, the invention is not restricted to this type of vehicle, but may also be used in other vehicles such as buses, trailers, wheel loaders, excavators, etc.

BACKGROUND

Electrically or partly electrically operated heavy-duty vehicles are becoming increasingly common. For heavy-duty vehicles, it may be desirable to provide more than one electric machine for propulsion of the vehicle, and also to provide electric power to auxiliary systems and for power take-off. In such powertrains including two power units, a common transmission may be provided, transmitting torque from each one of the electric machines to a common output shaft used to propel a driven axle of the vehicle.

US 2009/0019967 discloses a powertrain including two electric machines and a common transmission for torque transmission from each of the electric machines to a common output shaft for driving the vehicle. Each electric machine is connected to a corresponding input shaft, on which input gearwheels are provided for selective transmission of torque via corresponding output gearwheels provided on the common output shaft.

There is an ongoing strive to improve the powertrains of electrically operated vehicles and combine powertrain efficiency with a broad power range.

SUMMARY

A primary object of the invention is to provide an in at least some aspect improved powertrain for a vehicle including a power take-off (PTO) device. In particular, it is an object to provide such an improved powertrain which uses two independently controllable power units, and in which the PTO device may be driven independently of the vehicle speed.

According to a first aspect of the invention, the above object is achieved by a powertrain for a vehicle according to claim 1. The powertrain comprises:
a first power unit,
a second power unit,
a propeller shaft for driving a driven axle of the vehicle,
a power take-off device,
a transmission comprising:
  a first input shaft drivingly connected to the first power unit, a second input shaft drivingly connected to the second power unit, an output shaft drivingly connected to the propeller shaft, and a countershaft to which the power take-off device is drivingly connectable or connected,
  a first input shaft gearwheel arranged on the first input shaft,
  a second input shaft gearwheel arranged on the second input shaft,
  first and second countershaft gearwheels arranged on the countershaft, the first countershaft gearwheel being arranged or arrangeable in driving connection with the second input shaft gearwheel,
  a set of output shaft gearwheels rotatably arranged on the output shaft, comprising at least:
    a first output shaft gearwheel arranged in driving connection with the first input shaft gearwheel,
    a second output shaft gearwheel arranged in driving connection with the first countershaft gearwheel, and
    a third output shaft gearwheel arranged in driving connection with the second countershaft gearwheel,
  a first gear engaging device and a second gear engaging device, wherein, in a first mode of operation of the transmission, the first gear engaging device is in a first gear engaging device first state, in which it rotationally connects the first output shaft gearwheel to the output shaft, and the second gear engaging device is in a second gear engaging device neutral state, in which it rotationally disconnects the output shaft from the second output shaft gearwheel and from the third output shaft gearwheel, so that no parts of the powertrain are drivingly connected to both of the first and second power units in the first mode of operation.

In the first mode of operation of the transmission, since no parts of the powertrain are drivingly connected to both of the first and second power units, the PTO device may be driven solely by the second power unit, and the propeller shaft may be driven solely by the first power unit. The propeller shaft drives the driven axle, in turn driving, e.g., driven wheels of the vehicle for propulsion of the vehicle at a vehicle speed. In this way, the PTO device may be driven independently of the vehicle speed.

The output shaft gearwheels are rotatably arranged on the output shaft. In other words, they are arranged to be rotatable with respect to the output shaft around a common axis of rotation, corresponding to a longitudinal axis of the output shaft.

By the term "rotationally connect to" is intended "connect for common rotation with". For example, in the first gear engaging device first state, the first gear engaging device connects the first output shaft gearwheel for common rotation with the output shaft around the common axis of rotation, so that the first output shaft gearwheel is rotationally connected to the output shaft.

By a "driving connection" of two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rigidly connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

By a meshing engagement is intended a permanent meshing engagement.

The first countershaft gearwheel is arranged or arrangeable in driving connection with the second input shaft gearwheel. Thus, the first countershaft gearwheel may be arranged in driving connection with the second input shaft gearwheel, or means may be provided to drivingly connect it to the second input shaft gearwheel, such as via a coupling sleeve.

Optionally, the second gear engaging device is further selectively settable to:
- a second gear engaging device first state, in which it rotationally connects the second output shaft gearwheel to the output shaft, and in which torque is transmittable from the second input shaft to the output shaft via the second input shaft gearwheel, without using any one of the second countershaft gearwheel and the third output shaft gearwheel, and
- a second gear engaging device second state, in which it rotationally connects the third output shaft gearwheel to the output shaft, and in which torque is transmittable from the second input shaft to the output shaft via at least the second input shaft gearwheel, the second countershaft gearwheel and the third output shaft gearwheel.

In this way, torque from the second power unit is transmittable to the output shaft of the transmission, and thereby to the propeller shaft, with at least two different gear ratios. The PTO device may be driven simultaneously, but at a rotation speed that depends on the vehicle speed, or it may be disconnected by means of a clutch. Torque from both power units may herein be used simultaneously for propulsion of the vehicle.

Optionally, the first gear engaging device is further selectively settable to:
- a first gear engaging device neutral state, in which it rotationally disconnects at least the first output shaft gearwheel from the output shaft, and
- a first gear engaging device second state, in which it rotationally connects the first output shaft gearwheel to the second output shaft gearwheel.

The first gear engaging device neutral state enables disconnection of the first power unit from the output shaft, or alternatively, when applicable, connection via another first input shaft gearwheel.

With three states of each one of the gear engaging devices, the transmission of the powertrain is able to provide at least four different gear ratios using merely two gear engaging devices, each settable to one of three different states, or positions. The transmission thereby becomes robust and compact, while it also fulfils high demands on torque capacity and efficiency. It can furthermore be used to transmit torque from the two different power units to the driven wheels of a vehicle, either from one at a time or from both simultaneously. The transmission also allows uninterrupted torque transmission during acceleration and deceleration of the vehicle using two power units, since one of the input shafts can always be used for torque transfer while the other one is disconnected for gear changing. Moreover, both power units may be used for propulsion at start-up of the vehicle, when a large torque is needed, and after a predetermined time period, or when a torque demand for driving the vehicle is lower than a predetermined threshold, the second power unit can be disconnected from the output shaft and used merely for driving the PTO device via the countershaft.

Optionally, in the first gear engaging device second state, torque is transmittable from the first input shaft to the output shaft via the countershaft. Torque is thereby also transmittable from the first input shaft to the PTO device via the countershaft.

Optionally, the first input shaft gearwheel is fixed for common rotation with the first input shaft, and/or the second input shaft gearwheel is fixed for common rotation with the second input shaft. This improves the robustness of the transmission since no clutch or similar is necessary for fixing the first and/or the second gearwheel/s to the respective input shaft/s. Each of the two input shafts can be disconnected from the output shaft and/or from the countershaft using the first and second gear engaging devices.

Optionally, the first countershaft gearwheel is fixed for common rotation with the countershaft, and/or the second countershaft gearwheel is fixed for common rotation with the countershaft. "Fixed for common rotation" is herein to be understood as "permanently fixed for common rotation".

Optionally, the second output shaft gearwheel is arranged in meshing engagement with the first countershaft gearwheel, and/or the third output shaft gearwheel is arranged in meshing engagement with the second countershaft gearwheel.

Optionally, the transmission further comprises a fourth output shaft gearwheel rotatably arranged on the output shaft, the fourth output shaft gearwheel being fixed for common rotation with the second output shaft gearwheel, wherein the second input shaft gearwheel is arranged in driving connection with the fourth output shaft gearwheel. Instead of providing the fourth output shaft gearwheel permanently fixed for common rotation with the second output shaft gearwheel, a coupling sleeve or similar may be provided for selectively fixing the fourth output shaft gearwheel to the second output shaft gearwheel.

Optionally, the gearwheels are dimensioned so that a speed ratio for torque transfer between the first input shaft and the first output shaft gearwheel is higher than a speed ratio for torque transfer between the second input shaft and the second output shaft gearwheel. This enables an efficient gear shifting sequence with uninterrupted torque transfer when accelerating a vehicle from a stand-still.

Optionally, the first input shaft and the second input shaft are non-coaxially arranged. This facilitates the use of small diameter power units, such as small diameter electric machines.

Optionally, the power take-off device comprises a selectively engageable clutch for drivingly connecting the power take-off device to the countershaft. By means of the clutch, it is possible to disconnect the PTO device from the countershaft and thereby use torque from both of the power units for driving the propeller shaft without driving the PTO device.

Optionally, the clutch is a tooth clutch. When the vehicle is in motion and propelled solely by the first power unit, such as in the first mode of operation of the transmission, the tooth clutch can be engaged by controlling the second power unit to a low or zero rotational speed.

Optionally, at least one of the first and second power units is an electric machine. Both of the first and second power units may be electric machines of the same type or of different types. At least one of the power units may alternatively be an internal combustion engine.

The first power unit may be directly coupled to the first input shaft, or it may be coupled to the first input shaft via a clutch member, such as a friction clutch. The second power unit may be directly coupled to the second input shaft, or it may be coupled to the second input shaft via a clutch member, such as a friction clutch.

According to a second aspect of the invention, at least the primary object is also achieved by a vehicle comprising a powertrain according to the first aspect. The vehicle may for example be a fully electrified vehicle, or a hybrid vehicle comprising at least one power unit in the form of a combustion engine in addition to one or two power unit(s) in the form of electric machine(s). Advantages and advantageous features of the vehicle according to the invention appear from the above description of the first aspect of the invention.

According to a third aspect of the invention, a method for controlling a powertrain according to the first aspect is provided. The method comprises:
- controlling the first gear engaging device to the first gear engaging device first state and the second gear engaging device to the second gear engaging device neutral state,
- controlling the first power unit to a first rotational speed or torque as requested for driving the propeller shaft, and
- controlling the second power unit to a second rotational speed or torque as requested for driving the power take-off device.

According to a fourth aspect of the invention, a powertrain control device configured to perform the method according to the third aspect is provided. The powertrain control device may comprise a first actuator for actuating the first gear engaging device and a second actuator for actuating the second gear engaging device in response to, e.g., an operator request. The powertrain control device further comprises electronic circuitry for automatically controlling the actuators, communicating with other systems and control units of the vehicle, etc.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS

Figure 1:
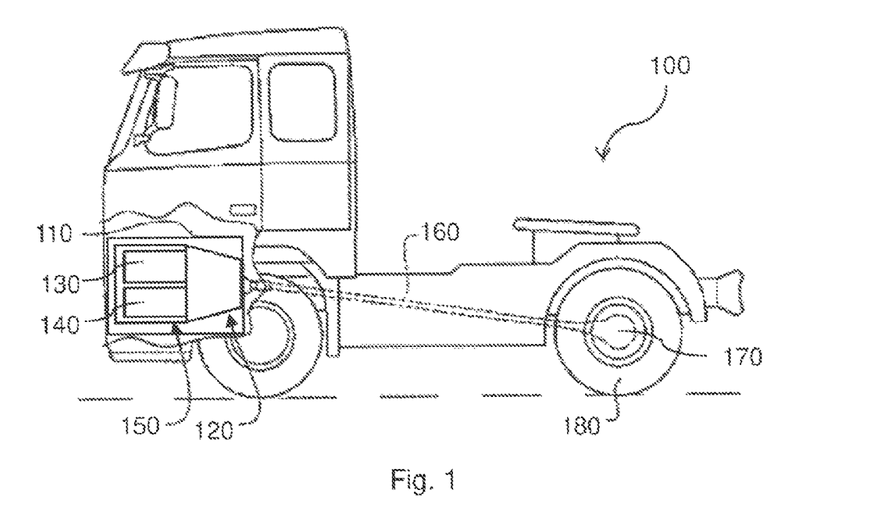
FIG. 1 schematically illustrates a vehicle according to an embodiment of the invention, FIG. 2 schematically illustrates a powertrain according to a first embodiment of the invention.

A vehicle 100 in the form of a truck according to an embodiment of the invention is schematically shown in FIG. 1. The vehicle 100 includes a powertrain 110 with a power unit assembly 150 for propulsion of the vehicle 100. The power unit assembly 150 comprises at least two power units 130, 140 in the form of electric machines 130, 140 connected to a transmission 120 and configured to be powered by an electric energy storage system (not shown) of the vehicle 100. The transmission 120 is arranged to transfer torque from the power unit assembly 150 to a propeller shaft 160 connecting the transmission 120 to a driven axle 170 that drives driven wheels 180 of the vehicle 100. The vehicle further comprises a power take-off (PTO) device (not shown).

Thus, in the shown embodiment, the vehicle 100 is a fully electrified vehicle configured to be driven solely by the power unit assembly 150. The vehicle 100 may be arranged with more than one driven axle, such as two or more driven axles. The power unit assembly 150 of the vehicle 100 may comprise more than two electric machines, such as three or four electric machines. The vehicle may also be a hybrid vehicle, provided with a combustion engine in addition to the electric machines 130, 140. The electric machines 130, 140 may be in the form of electric motors/generators.

Of course, the vehicle and the powertrain may have many different configurations. By way of example, the electric machine assembly 150 and the transmission 120 do not need to be provided at a front of the vehicle, but may, e.g., be combined with a rear axle of the vehicle.

Figure 2:
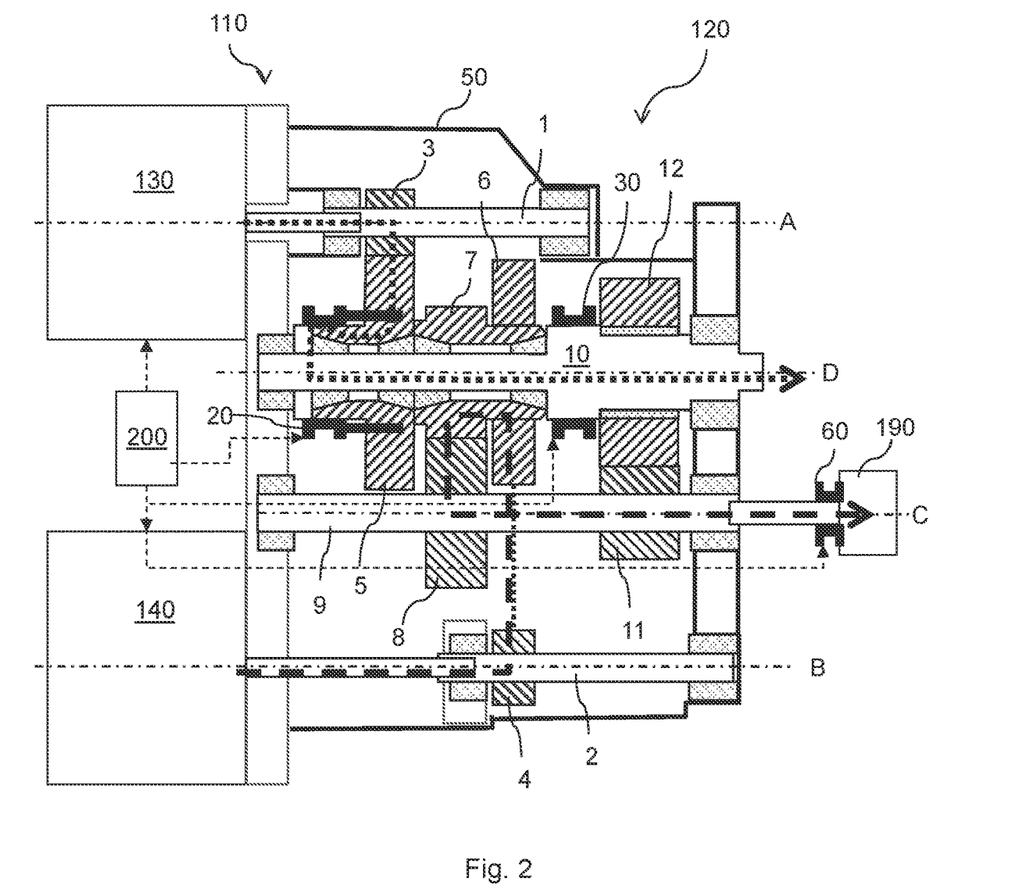

FIG. 2 illustrates parts of a powertrain 110 according to a first embodiment of the invention, including a transmission 120, a first electric machine 130, a second electric machine 140, and a power take-off (PTO) device 190. The transmission 120 comprises a first input shaft 1 drivingly connected to the first electric machine 130 and a second input shaft 2 drivingly connected to the second electric machine 140. The transmission 120 further comprises an output shaft 10 configured to be drivingly connected to the propeller shaft 160 of the vehicle 100, and a countershaft 9, drivingly connectable to the PTO device 190 via a clutch 60. The shafts 1, 2, 9, 10 are mounted to a transmission housing 50 using bearings, shown as dotted areas in the figures.

A first input shaft gearwheel 3 is arranged on the first input shaft 1 and fixed for common rotation therewith around a longitudinal axis A of the first input shaft 1. A second input shaft gearwheel 4 is arranged on the second input shaft 2 and fixed for common rotation therewith around a longitudinal axis B of the second input shaft 2. A first countershaft gearwheel 8 and a second countershaft gearwheel 11 are arranged on the countershaft 9 and fixed for common rotation therewith around a longitudinal axis C of the countershaft 9. A set of output shaft gearwheels are rotatably arranged on the output shaft 10, i.e., rotatable around a longitudinal axis D of the output shaft 10, independently of the output shaft 10. Bearings are for this purpose provided between the respective output shaft gearwheels and the output shaft 10. The set of output shaft gearwheels include:
- a first output shaft gearwheel 5 arranged in meshing engagement with the first input shaft gearwheel 3, a second output shaft gearwheel 7 arranged in meshing engagement with the first countershaft gearwheel 8, a third output shaft gearwheel 12 arranged in meshing engagement with the second countershaft gearwheel 11, and a fourth output shaft gearwheel 6 arranged in meshing engagement with the second input shaft gearwheel 4, as illustrated by the dotted line in FIG. 1, and permanently fixed to the second output shaft gearwheel 7.

All output shaft gearwheels 5, 6, 7, 12 have different diameters, indicative of different number of teeth on the respective gearwheels. The gearwheels of the transmission 120 are further dimensioned so that at least four different speed ratios for torque transfer are provided. The gearwheels are dimensioned so that the speed ratio for torque transfer between the first input shaft 1 and the first output shaft gearwheel 5 is higher than the speed ratio for torque transfer between the second input shaft 2 and the second output shaft gearwheel 7.

The transmission 120 further comprises a first gear engaging device 20 and a second gear engaging device 30, which may, e.g., be sleeve members that may be referred to as clutch sleeves, clutch collars, engaging sleeves, or similar. Shift forks (not shown) may be provided for moving the gear engaging devices 20, 30 so as to change gears. Gear shifting may be controlled from a transmission control unit using, e.g., electric, hydraulic, or pneumatic actuators to move the shift forks. Herein, a powertrain control device 200 is schematically shown to include the transmission control unit. The powertrain control device 200 is configured to control the first and second power units 130, 140 as well as the first and second gear engaging devices 20, 30 and the clutch 60, e.g., by directly or via a separately provided transmission control unit controlling the actuators.

The first gear engaging device 20 is selectively settable to one of a first gear engaging device first state, a first gear engaging device neutral state, and a first gear engaging device second state. The second gear engaging device 30 is selectively settable to one of a second gear engaging device first state, a second gear engaging device neutral state, and a second gear engaging device second state.

A first mode of operation of the transmission is shown in FIG. 2. In this first mode of operation, the first gear engaging device 20 is in the first gear engaging device first state, and the second gear engaging device 30 is in the second gear engaging device neutral state.

In the first mode of operation, the first gear engaging device 20 rotationally connects the first output shaft gearwheel 5 to the output shaft 10, i.e., it connects the first output shaft gearwheel 5 and the output shaft 10 for common rotation. Torque from the first input shaft 1 may thereby be transmitted to the output shaft 10 via the first input shaft gearwheel 3 fixed on the first input shaft 1 and the first output shaft gearwheel 5, which are in the shown embodiment in meshing engagement. The second gear engaging device 30 allows the second output shaft gearwheel 7 and the third output shaft gearwheel 12 to rotate with respect to the output shaft 10 as well as with respect to one another. The fourth output shaft gearwheel 6 rotates in common with the second output shaft gearwheel 7. Torque from the second input shaft 2 may thereby be transmitted to the countershaft 9 via the second input shaft gearwheel 4, the fourth and third output shaft gearwheels 6, 7 and the first countershaft gearwheel 8. No parts of the powertrain 110 are drivingly connected to both of the first and second electric machines 130, 140 in the first mode of operation.

In the first gear engaging device neutral state, the first gear engaging device 20 allows the first output shaft gearwheel 5 to rotate with respect to the second output shaft gearwheel 7 as well as with respect to the output shaft 10.

Figure 3:
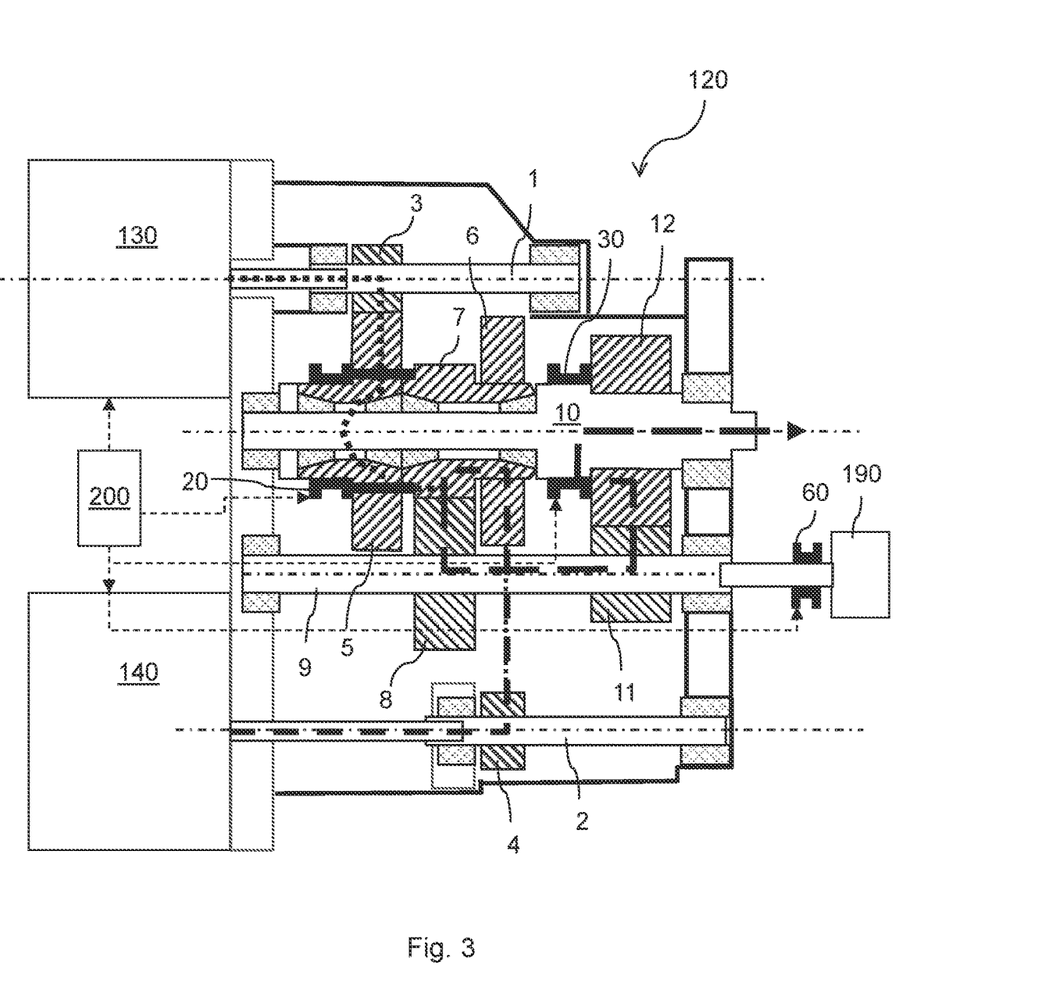
FIG. 3 illustrates an exemplary power flow in the powertrain in FIG. 2, and FIG. 4 schematically illustrates a powertrain according to a second embodiment of the invention.

In the first gear engaging device second state, shown in FIG. 3, the first gear engaging device 20 rotationally connects the first output shaft gearwheel 5 to the second output shaft gearwheel 7. In this state, the first output shaft gearwheel 5 may or may not be allowed to rotate with respect to the output shaft 10, depending on a state of the second gear engaging device 30.

In the second gear engaging device first state (not shown in the drawings), the second gear engaging device 30 rotationally connects the second output shaft gearwheel 7 to the output shaft 10. Thereby, in the shown embodiment, also the fourth output shaft gearwheel 6 is connected for common rotation with the output shaft 10. Torque is transmittable from the second input shaft 2 to the output shaft 10 via the second input shaft gearwheel 4, without using, i.e. without transmitting torque via, any one of the second countershaft gearwheel 11 and the third output shaft gearwheel 12. Instead, in the shown embodiment, torque is transmitted via meshing engagement between the second input shaft gearwheel 4, fixed on the second input shaft 2, and the fourth output shaft gearwheel 6.

In the second gear engaging device second state, shown in FIG. 3, the second gear engaging device 30 rotationally connects the third output shaft gearwheel 12 to the output shaft 10. Torque is in this state transmittable from the second input shaft 2 to the output shaft 10 via the input shaft gearwheel 4, the second countershaft gearwheel 11 and the third output shaft gearwheel 12. In the shown embodiment, torque is transmitted via meshing engagement between the second input shaft gearwheel 4 and the fourth output shaft gearwheel 6, meshing engagement between the second output shaft gearwheel 7, which is fixed to the fourth input shaft gearwheel 6, and the first countershaft gearwheel 8, and meshing engagement between the second countershaft gearwheel 11 and the third output shaft gearwheel 12.

As will be understood by the skilled person, the transmission 120 enables an uninterrupted power flow during an entire gear shifting sequence from a starting mode of operation to a high-speed mode of operation, with or without driving the PTO device 190.

FIG. 3 shows a starting mode of operation in which the first gear engaging device 20 is in the second gear engaging device second state and the second gear engaging device 30 is in the second gear engaging device second state. In this mode of operation, torque from both electric machines 130, 140 is transmitted to the output shaft 10 via the countershaft 9 and thereby used for propulsion of the vehicle 100. The clutch 60 is disengaged, i.e., the PTO device 190 is drivingly disconnected from the countershaft 9.

When the vehicle has accelerated and it is desirable to select a lower speed ratio for torque transmission between the first input shaft 1 and the output shaft 10, the second gear engaging device 30 is left in the second shifting device second state, so that the second electric machine 140 is used for propulsion of the vehicle 100, and the first gear engaging device 20 is moved to the first gear engaging device neutral state. The first gear engaging device 20 is thereafter moved to the first gear engaging device first state, so that both electric machines 130, 140 are again used to accelerate the vehicle 100.

The second gear engaging device 30 may now be moved to the second gear engaging device neutral state, and the transmission 120 is in the first mode of operation in which the vehicle is driven forward by the first electric machine 130 only. Herein, the second electric machine 140 may be controlled to a near-zero rotational speed so that the PTO device 190 may be connected by engaging the clutch 60. Alternatively, the PTO device 190 may remain disconnected if desired to further accelerate the vehicle 100 and move the second gear engaging device 30 to the second gear engaging device first state. Both electric machines 130, 140 may in that case be used for driving the vehicle 100 at a relatively high vehicle speed and with relatively small power losses thanks to the low number of meshing components used for driving the output shaft 10.

The first electric machine 130 may now be disconnected by moving the first gear engaging device 20 to the first gear engaging device neutral state. Thus, the vehicle 100 is driving at a relatively high speed with a relatively low power demand, using only the second electric machine 140 for propulsion, in a high-speed mode of operation of the transmission 120.

Figure 4:
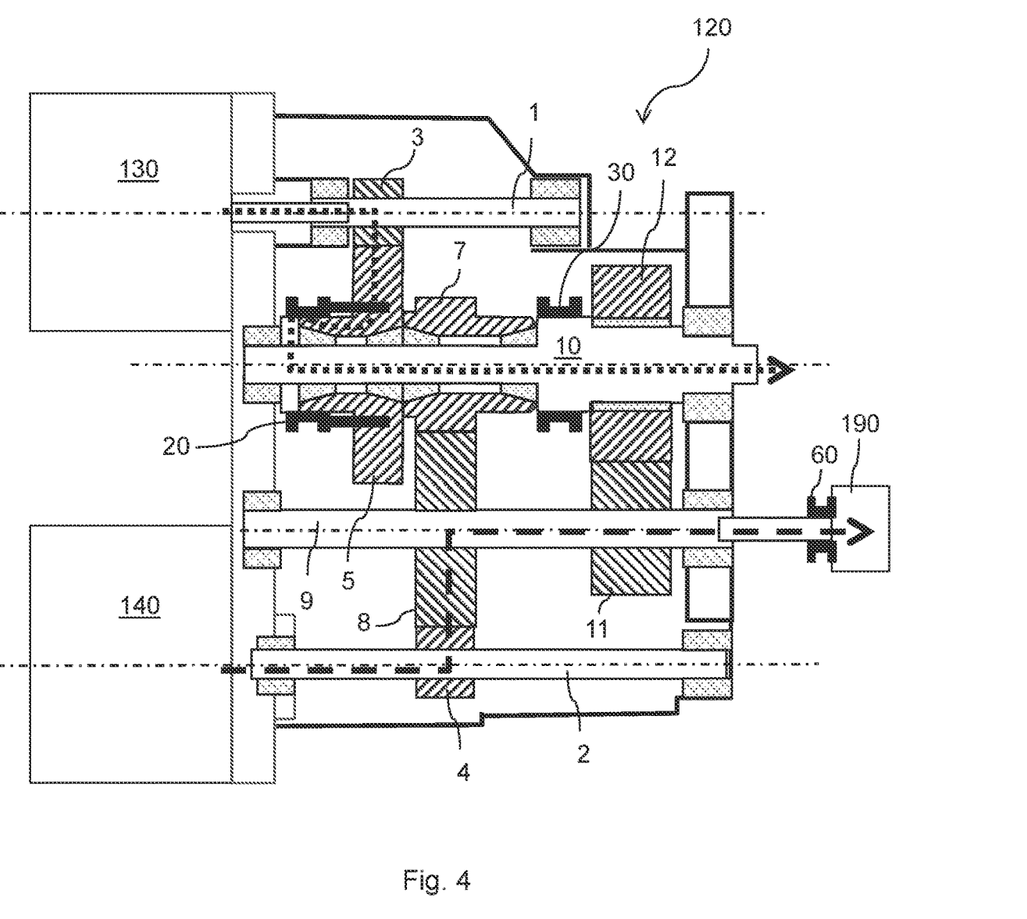

FIG. 4 illustrates parts of a powertrain 110 according to a second embodiment of the invention in the first mode of operation. The transmission 120 according to the second embodiment differs from the first embodiment in that, instead of providing a fourth output shaft gearwheel 6, the second input shaft gearwheel 4 is in meshing engagement with the first countershaft gearwheel 8. Thus, in the second shifting device first state, torque from the second output shaft 2 is transmitted to the output shaft 10 via the second input shaft gearwheel 4, the first countershaft gearwheel 8, and the second output shaft gearwheel 7, which is in meshing engagement with the first countershaft gearwheel 8. In this case, the second electric machine 140 and the first electric machine 130 rotate in different directions. A powertrain control device 200 may of course be provided also in this embodiment, although not illustrated in FIG. 4.

In other embodiments, more than one input shaft gearwheel may be provided on the first input shaft 1, such as a first input shaft second gearwheel (not shown) arranged in meshing engagement with the fourth output shaft gearwheel 6. The first input shaft second gearwheel may be rotatably arranged on the first input shaft 1, and an additional gear engaging device (not shown) may be provided for selectively connecting the first input shaft second gearwheel to the first input shaft 1 for common rotation therewith. Similarly, more than one input shaft gearwheel may be provided on the second input shaft 2.

The first gear engaging device 20 is in the shown embodiments illustrated as a single clutch collar extending through the first output shaft gearwheel 5, but it is also possible to provide separate clutch collars on each side of the first output shaft gearwheel 5, which are movable together using a single actuator.

Features from the different embodiments may of course be combined so that e.g., a first input shaft second gearwheel is provided in an embodiment without the fourth output shaft gearwheel, in which case it may be drivingly connected to another one of the output shaft gearwheels. Furthermore, an additional countershaft may be provided for torque transfer between the first input shaft 1 and the output shaft 10, or even two additional countershafts. For example, an additional countershaft could be arranged such that the second input shaft gearwheel 4 is in meshing engagement with a non-illustrated countershaft gearwheel, in turn in meshing engagement with either the countershaft gearwheel 8 or the fourth output shaft gearwheel 6.

Although not illustrated in the drawings, a planetary gear set for further reduction of rotational speed, and/or a retarder, may be connected to the output shaft 10.

Figure 5:
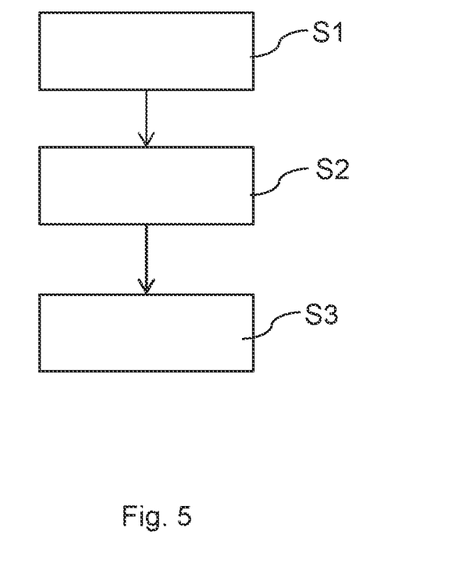
FIG. 5 is a flow chart illustrating a method according to an embodiment of the invention.

A method for controlling the powertrain 110 according to an embodiment of the invention is illustrated in FIG. 5. The method comprises the following steps:

S1: Controlling the first gear engaging device 20 to the first gear engaging device first state and the second gear engaging device 30 to the second gear engaging device neutral state, thereby obtaining the first mode of operation of the transmission.

S2: Controlling the first power unit 130 to a first rotational speed or torque as requested for driving the propeller shaft 160.

S3: Controlling the second power unit 140 to a second rotational speed or torque as requested for driving the power take-off device 190.

The powertrain control device 200 may be an electronic device configured to perform the method illustrated in FIG. 5. It may for this purpose comprise means for controlling the first power unit 130, means for controlling the second power unit 140, and means for controlling the transmission 120, including at least the gear engaging devices 20, 30 and the clutch 60. The powertrain control device 200 may be configured to control the power units 130, 140 and the transmission 120 in dependence on a first torque request for driving the propeller shaft 160 and a second torque request for driving the PTO device 190.

The powertrain control device 200 may include a microprocessor, a microcontroller, a programmable digital signal processor or another programmable device. Thus, the powertrain control device 200 comprises electronic circuits and connections (not shown) as well as processing circuitry (not shown) such that the powertrain control device 200 can communicate with different parts of the vehicle 100 or with different control units of the vehicle 100, such as with various sensors, systems and control units, in particular with one or more electronic control units (ECUs) controlling electrical systems or subsystems in the vehicle 100, such as an energy storage system control unit of an electric energy storage system (not shown) of the vehicle 100. The powertrain control device 200 may comprise modules in either hardware or software, or partially in hardware or software, and communicate using known transmission buses such a CAN-bus and/or wireless communication capabilities. The processing circuitry may be a general-purpose processor or a specific processor. The powertrain control device 200 may comprise a non-transitory memory for storing computer program code and data. Thus, the skilled person realizes that the powertrain control device 200 may be embodied by many different constructions. Although herein illustrated as a single unit, the powertrain control device 200 may be formed of several different control units configured to communicate with each other, such as separate control units for controlling the power units 130, 140 and for controlling the transmission 120.

It is to be understood that the present invention is not limited to the embodiments described above and illustrated in the drawings; rather, the skilled person will recognize that many changes and modifications may be made within the scope of the appended claims.

The invention claimed is:

1. A powertrain for a vehicle, comprising:
a first power unit;
a second power unit;
a propeller shaft for driving a driven axle of the vehicle;
a power take-off device;

a transmission comprising:
  a first input shaft drivingly connected to the first power unit, a second input shaft drivingly connected to the second power unit, an output shaft drivingly connected to the propeller shaft, and a countershaft to which the power take-off device is drivingly connectable or connected;
  a first input shaft gearwheel arranged on the first input shaft;
  a second input shaft gearwheel arranged on the second input shaft;
  first and second countershaft gearwheels arranged on the countershaft, the first countershaft gearwheel being arranged or arrangeable in driving connection with the second input shaft gearwheel;
  a set of output shaft gearwheels rotatably arranged on the output shaft, comprising at least:
    a first output shaft gearwheel arranged in driving connection with the first input shaft gearwheel;
    a second output shaft gearwheel arranged in driving connection with the first countershaft gearwheel; and
    a third output shaft gearwheel arranged in driving connection with the second countershaft gearwheel;
  a first gear engaging device and a second gear engaging device, wherein, in a first mode of operation of the transmission, the first gear engaging device is in a first gear engaging device first state, in which it rotationally connects the first output shaft gearwheel to the output shaft, and the second gear engaging device is in a second gear engaging device neutral state, in which it rotationally disconnects the output shaft from the second output shaft gearwheel and from the third output shaft gearwheel, so that no parts of the powertrain are drivingly connected to both of the first and second power units in the first mode of operation;
  wherein the first gear engaging device is further selectively settable to:
    a first gear engaging device neutral state, in which it rotationally disconnects at least the first output shaft gearwheel from the output shaft, and
    a first gear engaging device second state, in which it rotationally connects the first output shaft gearwheel to the second output shaft gearwheel.

2. The powertrain according to claim 1, wherein the second gear engaging device is further selectively settable to:
  a second gear engaging device first state, in which it rotationally connects the second output shaft gearwheel to the output shaft, and in which torque is transmittable from the second input shaft to the output shaft via the second input shaft gearwheel, without using any one of the second countershaft gearwheel and the third output shaft gearwheel; and
  a second gear engaging device second state, in which it rotationally connects the third output shaft gearwheel to the output shaft, and in which torque is transmittable from the second input shaft to the output shaft via at least the second input shaft gearwheel, the second countershaft gearwheel and the third output shaft gearwheel.

3. The powertrain according to claim 1, wherein, in the first gear engaging device second state, torque is transmittable from the first input shaft to the output shaft via the countershaft.

4. The powertrain according to claim 1, wherein the first input shaft gearwheel is fixed for common rotation with the first input shaft, and/or wherein the second input shaft gearwheel is fixed for common rotation with the second input shaft.

5. The powertrain according to claim 1, wherein the first countershaft gearwheel is fixed for common rotation with the countershaft, and/or wherein the second countershaft gearwheel is fixed for common rotation with the countershaft.

6. The powertrain according to claim 1, wherein the second output shaft gearwheel is arranged in meshing engagement with the first countershaft gearwheel, and/or wherein the third output shaft gearwheel is arranged in meshing engagement with the second countershaft gearwheel.

7. The powertrain according to claim 1, further comprising a fourth output shaft gearwheel rotatably arranged on the output shaft, the fourth output shaft gearwheel being fixed for common rotation with the second output shaft gearwheel, wherein the second input shaft gearwheel is arranged in driving connection with the fourth output shaft gearwheel.

8. The powertrain according to claim 1, wherein the gearwheels are dimensioned so that a speed ratio for torque transfer between the first input shaft and the first output shaft gearwheel is higher than a speed ratio for torque transfer between the second input shaft and the second output shaft gearwheel.

9. The powertrain according to claim 1, wherein the first input shaft and the second input shaft are non-coaxially arranged.

10. The powertrain according to claim 1, wherein the power take-off device comprises a selectively engageable clutch for drivingly connecting the power take-off device to the countershaft.

11. The powertrain according to claim 1, wherein at least one of the first and second power units is an electric machine, or wherein both of the first and second power units are electric machines.

12. A vehicle comprising a powertrain according to claim 1.

13. A method for controlling a powertrain according to claim 1, the method comprising:
  controlling the first gear engaging device to the first gear engaging device first state and the second gear engaging device to the second gear engaging device neutral state;
  controlling the first power unit to a first rotational speed or torque as requested for driving the propeller shaft; and
  controlling the second power unit to a second rotational speed or torque as requested for driving the power take-off device.

14. A powertrain control device configured to perform the method according to claim 13.

15. A powertrain for a vehicle, comprising:
  a first power unit in the form of a first electric machine;
  a second power unit in the form of a second electric machine;
  a propeller shaft for driving a driven axle of the vehicle;
  a power take-off device;
  a transmission comprising:
    a first input shaft drivingly connected to the first power unit, a second input shaft drivingly connected to the second power unit, an output shaft drivingly connected to the propeller shaft, and a countershaft to which the power take-off device is drivingly connectable or connected;
a first input shaft gearwheel arranged on the first input shaft;
a second input shaft gearwheel arranged on the second input shaft;
first and second countershaft gearwheels arranged on the countershaft, the first countershaft gearwheel being arranged or arrangeable in driving connection with the second input shaft gearwheel;
a set of output shaft gearwheels rotatably arranged on the output shaft, comprising at least:
a first output shaft gearwheel arranged in driving connection with the first input shaft gearwheel;
a second output shaft gearwheel arranged in driving connection with the first countershaft gearwheel; and
a third output shaft gearwheel arranged in driving connection with the second countershaft gearwheel;
a first gear engaging device and a second gear engaging device, wherein, in a first mode of operation of the transmission, the first gear engaging device is in a first gear engaging device first state, in which it rotationally connects the first output shaft gearwheel to the output shaft, and the second gear engaging device is in a second gear engaging device neutral state, in which it rotationally disconnects the output shaft from the second output shaft gearwheel and from the third output shaft gearwheel, so that no parts of the powertrain are drivingly connected to both of the first and second power units in the first mode of operation,
wherein the gearwheels are dimensioned so that a speed ratio for torque transfer between the first input shaft and the first output shaft gearwheel is higher than a speed ratio for torque transfer between the second input shaft and the second output shaft gearwheel.

16. The powertrain according to claim 15, wherein the second gear engaging device is further selectively settable to:
a second gear engaging device first state, in which it rotationally connects the second output shaft gearwheel to the output shaft, and in which torque is transmittable from the second input shaft to the output shaft via the second input shaft gearwheel, without using any one of the second countershaft gearwheel and the third output shaft gearwheel; and
a second gear engaging device second state, in which it rotationally connects the third output shaft gearwheel to the output shaft, and in which torque is transmittable from the second input shaft to the output shaft via at least the second input shaft gearwheel, the second countershaft gearwheel and the third output shaft gearwheel.

17. The powertrain according to claim 15, wherein, in the first gear engaging device second state, torque is transmittable from the first input shaft to the output shaft via the countershaft.

18. The powertrain according to claim 15, wherein the first input shaft gearwheel is fixed for common rotation with the first input shaft, and/or wherein the second input shaft gearwheel is fixed for common rotation with the second input shaft.

19. The powertrain according to claim 15, wherein the first countershaft gearwheel is fixed for common rotation with the countershaft, and/or wherein the second countershaft gearwheel is fixed for common rotation with the countershaft.

20. The powertrain according to claim 15, wherein the second output shaft gearwheel is arranged in meshing engagement with the first countershaft gearwheel, and/or wherein the third output shaft gearwheel is arranged in meshing engagement with the second countershaft gearwheel.

* * * * *